United States Patent
Caulfeild et al.

(10) Patent No.: US 10,711,625 B2
(45) Date of Patent: Jul. 14, 2020

(54) WALL CONSTRUCTION FOR GASPATH TRAVERSING COMPONENT

(71) Applicant: PRATT & WHITNEY CANADA CORP., Longueuil (CA)

(72) Inventors: Stephen Caulfeild, Longueuil (CA); Kin-Leung Cheung, Toronto (CA); Mathieu Poulin, Toronto (CA); Bryan William Olver, Nobleton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 879 days.

(21) Appl. No.: 14/136,355

(22) Filed: Dec. 20, 2013

(65) Prior Publication Data
US 2015/0176425 A1    Jun. 25, 2015

(51) Int. Cl.
  *F01D 9/02*    (2006.01)
  *F01D 5/28*    (2006.01)

(52) U.S. Cl.
  CPC ............ *F01D 9/02* (2013.01); *F01D 5/282* (2013.01); *F05D 2300/224* (2013.01); *F05D 2300/433* (2013.01); *Y10T 29/49238* (2015.01)

(58) Field of Classification Search
  CPC ............... F01D 9/02; F05D 2240/121; F05D 2300/603; F05D 2300/614
  USPC ............................... 415/200, 211.2, 118
  See application file for complete search history.

(56) References Cited

U.S. PATENT DOCUMENTS

| | | | |
|---|---|---|---|
| 2,765,227 A * | 10/1956 | Goetzel | C22C 32/00 419/15 |
| 3,536,092 A * | 10/1970 | Mills | F16K 1/425 137/329.02 |
| 3,814,160 A | 6/1974 | Creasey | |
| 4,074,742 A | 2/1978 | Chamblin | |
| 4,283,455 A | 8/1981 | McGee | |
| 4,492,522 A * | 1/1985 | Rossmann | C23C 30/005 415/200 |
| 4,802,255 A | 2/1989 | Breuer et al. | |
| 4,977,345 A | 12/1990 | Toperzer | |
| 4,982,767 A | 1/1991 | Pezzoli et al. | |
| 5,015,859 A | 5/1991 | Uejio | |
| 5,225,478 A | 7/1993 | Kleisle | |
| 5,303,478 A | 4/1994 | Gugel | |
| 5,306,120 A | 4/1994 | Hammer et al. | |
| 5,313,909 A | 5/1994 | Tseng et al. | |
| 5,704,999 A | 1/1998 | Lukich | |

(Continued)

FOREIGN PATENT DOCUMENTS

GB    1444990 A1 * 11/1972

*Primary Examiner* — Richard A Edgar
*Assistant Examiner* — Maxime M Adjagbe
(74) *Attorney, Agent, or Firm* — Norton Rose Fulbright Canada LLP

(57) ABSTRACT

A gaspath traversing component of a gas turbine engine comprises a wall having an outer edge surface and a thickness relative to the gaspath, the wall having a plurality of layers of composite materials forming the thickness. A wear indication layer is embedded within the plurality of layers of composite material, the wear indication layer being visually contrasting with the composite material. The wear indication layer is positioned interiorly of at least one layer of said plurality of layers of composite material relative to the outer edge surface. A method for attending to a gas traversing component of a gas turbine engine is also provided.

20 Claims, 2 Drawing Sheets

(56) References Cited

U.S. PATENT DOCUMENTS

| | | |
|---|---|---|
| 6,653,943 B2 | 11/2003 | Lamb et al. |
| 7,424,936 B2 | 9/2008 | McClellan |
| 7,883,737 B2 * | 2/2011 | Mitchell ................. F01D 5/282 |
| | | 427/409 |
| 2009/0120101 A1 * | 5/2009 | Lomasney .......... C23C 28/3455 |
| | | 60/796 |
| 2012/0049610 A1 * | 3/2012 | Lew ........................ B60B 21/08 |
| | | 301/95.103 |

* cited by examiner

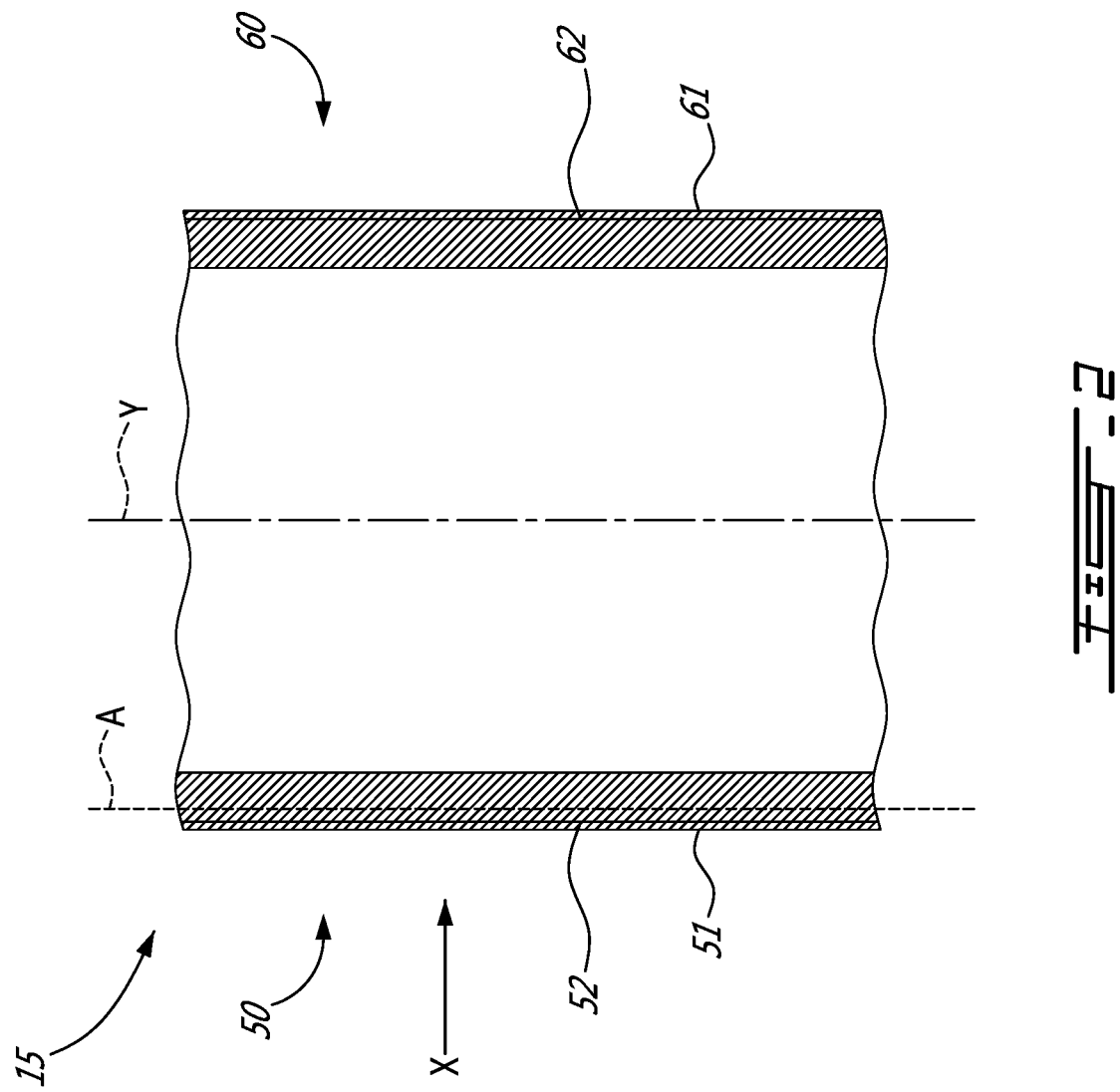

WALL CONSTRUCTION FOR GASPATH TRAVERSING COMPONENT

TECHNICAL FIELD

The present application relates to gas turbine engines and to a construction of gaspath traversing components thereof.

BACKGROUND OF THE ART

Composite laminates are increasingly used in gas turbine engines, such as for structural components in the engine bypass gaspath. However, structural components made from composite laminates are subjected to erosion by airborne contaminants, such as water and hail. Composite laminates are often unpainted. Due to their uniform visual properties, it may be difficult to determine during a general visual inspection if a part is worn or is eroded beyond an acceptable service limit of the component.

SUMMARY

In accordance with an embodiment of the present disclosure, there is provided a gaspath traversing component of a gas turbine engine comprising: a wall having an outer edge surface and a thickness relative to the gaspath, the wall having a plurality of layers of composite materials forming the thickness; and at least one wear indication layer embedded within the plurality of layers of composite material, the at least one wear indication layer being visually contrasting with the composite material, the at least one wear indication layer being positioned interiorly of at least one layer of said plurality of layers of composite material relative to the outer edge surface.

In accordance with another embodiment of the present disclosure, there is provided a gas turbine engine comprising: a nacelle, an engine core and an engine bypass duct therebetween; and at least one gaspath traversing component in the engine bypass duct comprising: a wall having an outer edge surface and a thickness relative to the gaspath, the wall having a plurality of layers of composite materials forming the thickness; and at least one wear indication layer embedded within the plurality of layers of composite material, the at least one wear indication layer being visually contrasting with the composite material, the at least one wear indication layer being positioned interiorly of at least one layer of said plurality of layers of composite material relative to the outer edge surface.

In accordance with yet another embodiment of the present disclosure, there is provided a method for attending to a gas traversing component of a gas turbine engine, comprising: visually observing a leading edge surface of the gas traversing component after use; and if a visually contrasting wear indication layer is visible at the leading edge surface, attending to the gas traversing component for maintenance.

DESCRIPTION OF THE DRAWINGS

FIG. 2 is a cross-section view of a gaspath traversing component of the present disclosure.

DETAILED DESCRIPTION

Figure 1:
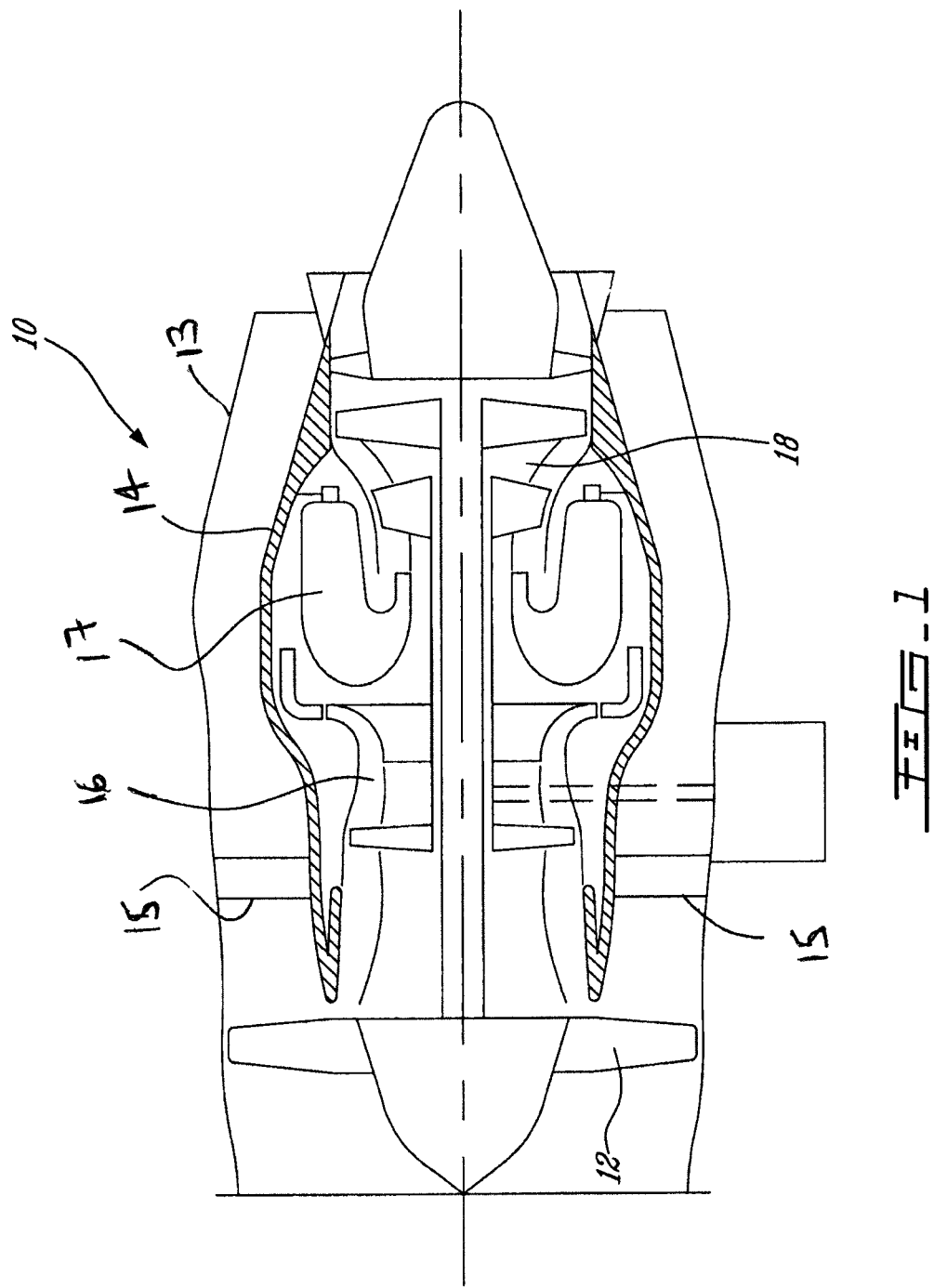
FIG. 1 is a schematic sectional view of a gas turbine engine comprising gaspath traversing components in accordance with the present disclosure.

FIG. 1 illustrates a gas turbine engine 10 of a type preferably provided for use in subsonic flights, generally comprising in serial flow communication a fan 12 through which ambient air is propelled. The gas turbine engine 10 comprises a nacelle 13 forming an outer shell of the gas turbine engine 10, and an engine core 14 inside the nacelle 13. A bypass duct is radially located in the space between the nacelle 13 and the outer surface of the engine core 14. Struts 15, a pair of which is shown in FIG. 1, are used to secure the nacelle 13 and the engine core 14 together. Further in the serial flow communication with the fan 12 is a compressor section 16 for pressurizing the air, a combustor 17 in which the compressed air is mixed with fuel and ignited for generating and annular stream of hot combustion gases, and a turbine section 18 for extracting energy from the combustion gases.

Referring to FIG. 2, a sectional view of the strut 15 is provided. The strut 15 is one of multiple types of gaspath traversing components that may have a wall constructed in accordance with the present disclosure. For the purposes of the patent disclosure, including the claims, a "gaspath traversing component" is any structure which is exposed to the gaspath and extends across or projects into at least a portion of the gaspath, so as to be exposed to gas flowing through the gaspath. In the embodiment of the strut 15, a tubular wall defines the body of the strut 15. The tubular wall is shown having a leading strut portion 50 and a trailing strut portion 60 with lateral walls therebetween. The leading strut portion 50 has a leading edge surface 51, namely a proximal outer edge surface relative to the gaspath X. From the leading edge surface 51, the wall has a thickness leading to an interior of the strut 15. The wall is constituted of a plurality of layers of composite material. In an embodiment, the layers of composite material are layers of a mixture of carbon fibers and epoxy laminated in a fabrication process.

As shown in FIG. 2, a wear indication layer 52 is embedded in the wall. The wear indication layer 52 is positioned inside at least one layer of the plurality of layers of composite material constituting the wall, i.e., the wear indication layer 52 is concealed from the exterior of the strut 15 by at least one layer of composite material forming the leading edge surface 51. According to an embodiment, the layer may consist of para-aramid fiber that is part of the co-molding or lamination process by which the strut 15 is fabricated. Para-aramid is one of multiple materials considered to be used for the wear indication layer 52, examples of which include textiles, woven cloths, metals (e.g., meshed), etc. As indicated in FIG. 2, a line A is shown and represents an acceptable service limit threshold beyond which erosion to the strut 15 would be considered to be inacceptable. It is observed that the wear indication layer 52 is between the leading edge surface 51 and the threshold A.

In the embodiment of FIG. 2, the strut 15 may be fully symmetrical about the plane passing through axis Y in FIG. 2. It is observed that this axis Y may be substantially radial relative to a longitudinal centerline of the gas turbine engine 10. In this symmetrical embodiment, the wall has a trailing strut portion 60, a trailing outer edge surface 61, and a wear indication layer 62. Between the leading strut portion 50 and the trailing strut portion 60 is the interior 70 of the strut 15. Due to the symmetry, the strut 15 may be reversed in such a way that the leading strut portion 50 becomes the trailing portion of the strut 15. This reversal may occur once the leading edge surface 31 has eroded to expose the wear indication layer 52. Indeed, as erosion primarily occurs on the leading edge of the strut 15 relatively to the trailing edge surface, the wear indication layer 52 may be visible on the trailing edge while not jeopardizing the structural integrity of the strut 15, provided that the wear indication layer 52 is to the exterior of the acceptable service limit threshold A.

The wear indication layer 52 visually contrasts with the material of the composite material. For instance, the visual contrast may be resulting from a difference in colour, grain, shape, fiber orientation or any combination thereof. It is also pointed out that the wear indication layer 52/62 may not perform any structural function and is simply provided as visual indicator. In the case of the presence of the wear indication layer into the tubular wall, it is considered to surround the full periphery of the tubular wall with the wear indication layer. Alternatively, the wear indication layer may be at most locally present, for instance on the leading edge and trailing edge of the wall as in FIG. 2. Relative to the threshold A, the core of the traversing component 15 has been sized to carry all required loads with the leading and trailing edges eroded to the wear indication layer 52/62.

A method for attending to the gas traversing component 15 hence comprises visually observing a leading edge surface of the gas traversing component after use. If a visually contrasting wear indication layer is visible at the leading edge surface, the gas traversing component is attended for maintenance (e.g., replaced, repaired, reversed). Thus, attending to the gas traversing component may involve reversing the gas traversing component such that a previously trailing edge surface becomes the leading edge surface. This <<new>> leading edge surface may be visually inspected to determine if the visually contrasting wear indication layer.

The above description is meant to be exemplary only, and one skilled in the art will recognize that changes may be made to the embodiments described without departing from the scope of the invention disclosed. For example, various components, fairings, protectors in a gaspath may have the wall construction of FIG. 2. Still other modifications which fall within the scope of the present invention will be apparent to those skilled in the art, in light of a review of this disclosure, and such modifications are intended to fall within the appended claims.

The invention claimed is:

1. A gaspath traversing component of a gas turbine engine comprising:
   a wall having an outer edge surface exposed to the gaspath and a thickness relative to the gaspath, the wall having a plurality of layers of composite materials forming the thickness, the composite materials including fibers in epoxy, the composite materials exposed to the gaspath to wear as a result of exposure to the gaspath; and
   at least one wear indication layer embedded between two of the plurality of layers of composite material, the at least one wear indication layer being made of a material different than that of both of the two of the plurality of layers of composite materials and being visually contrasting with the composite material, the at least one wear indication layer being positioned interiorly of at least one layer of said plurality of layers of composite material relative to the outer edge surface.

2. The gaspath traversing component according to claim 1, wherein the at least one wear indication layer has a different colour from the composite materials so as to be visually contrasting therewith.

3. The gaspath traversing component according to claim 1, wherein the wall is tubular so as to have a leading outer edge surface and a trailing outer edge surface.

4. The gaspath traversing component according to claim 3, wherein the gaspath traversing component is symmetrical about a plane generally transverse to the gaspath, the gaspath traversing component being reversible such that the leading outer edge surface becomes the trailing outer edge surface.

5. The gaspath traversing component according to claim 4, wherein both the leading outer edge surface and the trailing outer edge surface have one said wear indication layer therein.

6. The gaspath traversing component according to claim 1, wherein the fibers are carbon fibers and wherein the wear indication layer is para-aramid fiber.

7. The gaspath traversing component according to claim 1, wherein at least one wear indication layer is positioned between the outer edge surface and an acceptable service limit threshold.

8. The gaspath traversing component according to claim 1, wherein the gaspath traversing component is a strut.

9. The gaspath traversing component according to claim 1, wherein a fiber orientation of the at least one layer of the plurality of layers of composite materials is different than a fiber orientation of the at least one wear indication layer so as to be visually contrasting therewith.

10. A gas turbine engine comprising:
    a nacelle, an engine core and an engine bypass duct therebetween; and
    at least one gaspath traversing component in the engine bypass duct comprising:
      a wall having an outer edge surface exposed to the gaspath and a thickness relative to the gaspath, the wall having a plurality of layers of composite materials forming the thickness, the composite materials including fibers in epoxy, the composite materials exposed to the gaspath to wear as a result of exposure to the gaspath; and
      at least one wear indication layer embedded between two of the plurality of layers of composite material, the at least one wear indication layer being made of a material different than that of both of the two of the plurality of layers of composite materials and being visually contrasting with the composite material, the at least one wear indication layer being positioned interiorly of at least one layer of said plurality of layers of composite material relative to the outer edge surface.

11. The gas turbine engine according to claim 10, wherein the at least one wear indication layer has a different colour from the composite materials so as to be visually contrasting therewith.

12. The gas turbine engine according to claim 10, wherein the wall is tubular so as to have a leading outer edge surface and a trailing outer edge surface.

13. The gas turbine engine according to claim 12, wherein the gaspath traversing component is symmetrical about a plane generally traverse to the gaspath, the gaspath traversing component being reversible such that the leading outer edge surface becomes the trailing outer edge surface.

14. The gas turbine engine according to claim 13, wherein both the leading outer edge surface and the trailing outer edge surface have one said wear indication layer therein.

15. The gas turbine engine according to claim 10, wherein the fibers are carbon fibers and wherein the wear indication layer is para-aramid fiber.

16. The gas turbine engine according to claim 10, wherein at least one wear indication layer is positioned between the outer edge surface and an acceptable service limit threshold of the gaspath traversing component.

17. The gas turbine engine according to claim 10, wherein the gaspath traversing component is a strut.

18. A method for attending to a gaspath traversing component of a gas turbine engine, comprising:
- exposing the gaspath traversing component to a gaspath, the gaspath traversing component made from a composite material including fibers in epoxy, the gaspath traversing component having a wear indication layer embedded between two layers of composite material and made of a material different than that of both of the two layers of composite material;
- visually observing a leading edge surface of the gaspath traversing component after use exposure to the gaspath; and
- detecting that the wear indication layer is visible at the leading edge surface as a result of exposure of the gaspath traversing component to the gaspath and attending to the gaspath traversing component for maintenance.

19. The method according to claim 18, wherein attending to the gaspath traversing component comprises reversing the gaspath traversing component such that a previously trailing edge surface becomes the leading edge surface.

20. The method according to claim 19, further comprising attending to the gaspath traversing component for maintenance if a visually contrasting wear indication layer is visible at the leading edge surface following the reversing.

* * * * *